INVENTOR
GEOFFREY G. BARKER
BY
ATTORNEY

United States Patent Office 3,532,995
Patented Oct. 6, 1970

3,532,995
RESOLVER FOR DITHER TUNED MICROWAVE TUBES EMPLOYING CARRIER MODULATION AND PHASE SENSITIVE DETECTION
Geoffrey G. Barker, Basking Ridge, N.J., assignor, by mesne assignments, to Varian Associates, Palo Alto, Calif., a corporation of California
Filed Sept. 14, 1967, Ser. No. 667,720
Int. Cl. H03b 3/04
U.S. Cl. 328—133
3 Claims

ABSTRACT OF THE DISCLOSURE

A resolver for deriving an output signal representative of the instantaneous frequency deviation of the output of a dither tuned microwave tube is disclosed. A radar is described employing a dither tuned magnetron oscillator which transmits frequency modulated signals to a target. The reflected frequency modulated signals are received in a radar receiver in which the local oscillator is tuned to follow the instantaneous frequency deviation of the transmitted signal such that a constant intermediate frequency is obtained in the radar receiver. The local oscillator is tuned by means of an output derived from a resolver coupled to the dither tuner of the microwave tube to cause the local oscillator signal to track the outpute signal of the radar. The resolver includes a transformer with its primary circuit energized with a carrier signal as of 100 kHz. The secondary of the transformer is coupled to the dither tuner mechanism of the microwave tube such that the secondary winding is rotated in the transformer at the dither tuning cycle frequency. As a result, the output of the secondary is modulated at the dither tuning cycle frequency. The output of the secondary is compared in a phase sensitive detector with the unmodulated carrier signal to produce an output signal having a phase and magnitude representative of the instantaneous frequency deviation of the output of the microwave tube. The resolver output is fed to the radar receiver's tunable local oscillator, for example, a varactor tuned solid state R.F. power source, to cause the local oscillator frequency to track the instantaneous output frequency of the radar.

DESCRIPTION OF THE PRIOR ART

Heretofore, dither tuned microwave tubes have been utilized for supplying a frequency modulated output for a radar. In addition, a resolver has been provided coupled to the mechanical tuning arrangement of the microwave tube to provide an output having a phase and magnitude representative of the instantaneous frequency deviation of the transmitted radar signal. The resolver output has been fed to a tunable local oscillator, causing the local oscillator within the radar receiver to track the transmitted frequency so that the radar receiver will have a constant intermediate frequency. However, in prior art arrangements the resolver comprised a crystal to which a variable mechanical force was transmitted in response to movements of the tuning mechanism for changing the output frequency of the crystal. Such a prior art arrangement is described and claimed in copending U.S. application 487,697 filed Sept. 16, 1965, now U.S. Pat. 3,414,-761, issued Dec. 3, 1968, and assigned to the same assignee as the present invention. While such a resolver is suitable, it is desirable to provide an improved resolver which is less complex and more precise.

SUMMARY OF THE PRESENT INVENTION

The principal object of the present invention is to provide an improved resolver for dither tuned microwave tubes for deriving an output signal having a phase and magnitude representative of the instantaneous frequency deviation of the output of the microwave tube.

One feature of the present invention is the provision of a resolver for a dither tuned microwave tube which includes means for modulating a carrier frequency signal at the frequency of the dither tuning cycle frequency and means for comparing the unmodulated carrier with the modulated carried signal to derive an output having a phase and magnitude representative of the instantaneous frequency deviation of the output frequency of the microwave tube.

Another feature of the present invention is the same as the preceding feature wherein the resolver includes a transformer having a primary winding excited at the carrier frequency and a secondary winding which is rotatable at the dither tuning cycle frequency for modulating the output of the secondary winding and including a phase sensitive detector for comparing the carrier frequency with the modulated carrier frequency to derive the resolver output.

Other features and advantages of the present invention will become apparent upon the perusal of the following specification taken in connection with the accompanying drawings wherein:

BRIEF DESRIPTION OF THE DRAWINGS

Figure 1:
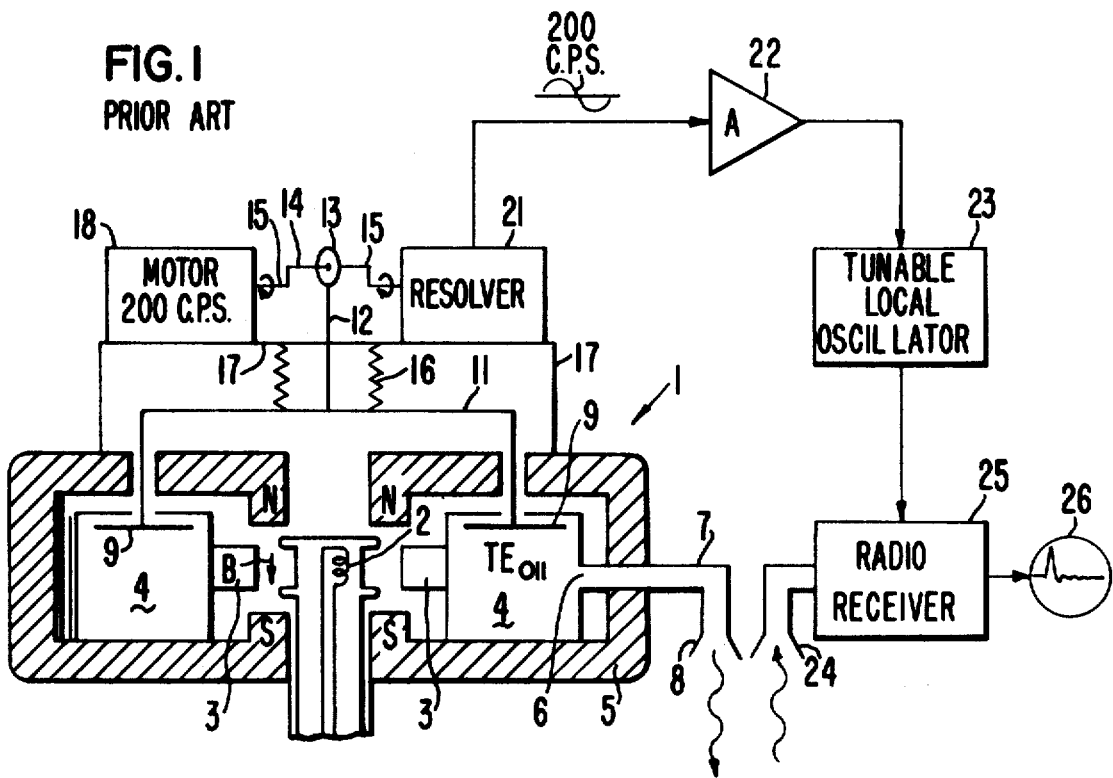
Figure 2:
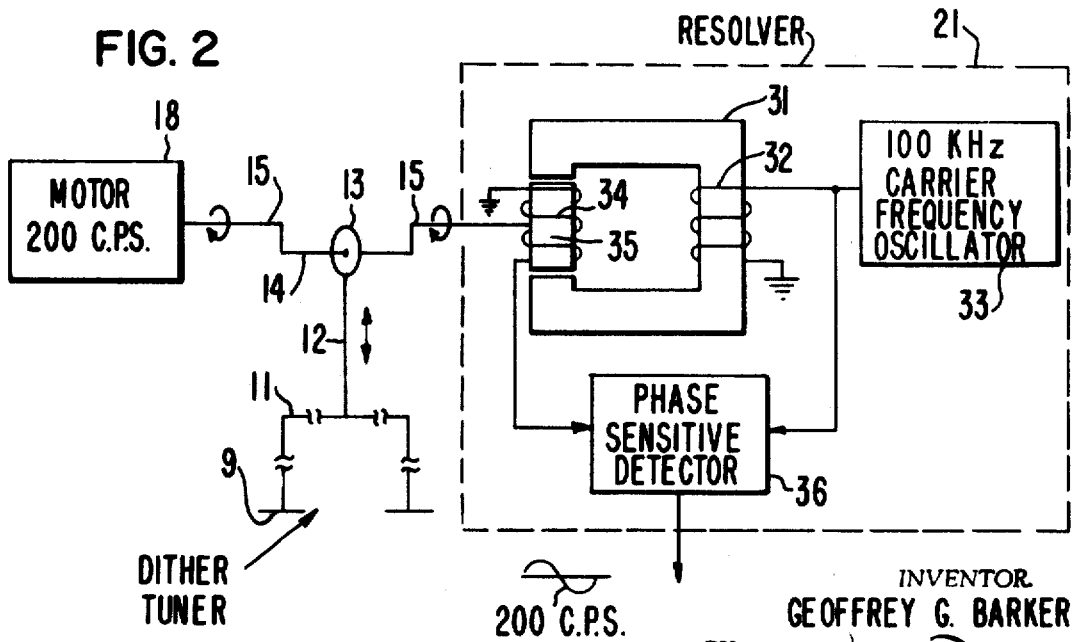

FIG. 1 is a schematic diagram, partly in section and partly in block diagram form, of a radar employing features of the present invention, and FIG. 2 is a schematic diagram, partly in block diagram form, of the resolver incorporating features of the present invention.

DESCRIPTION OF THE PREFERRED EMBODIMENTS

Referring now to FIG. 1 there is shown a prior art radar incorporating a dither tuned magnetron oscillator and a resolver for causing the local oscillator to track the instantaneous frequency deviation of the transmitted radar signal to provide a constant intermediate frequency in the radar receiver. More specifically, the transmitter portion of the radar includes a dither tuned magnetron oscillator 1 preferably of the coaxial type. The magnetron 1 includes a cylindrical thermionic cathode emitter 2 surrounded by an array of vane resonators 3 forming the anode structure. The vane resonators 3 are coupled via an array of coupling slots communicating between alternate resonators and a surrounding cylindrical cavity resonator 4 dimensioned for operation on a dominant circular electric mode therein. A bowl shaped magnet 5 surrounds the circular electric resonator 4 and provides an axially directed magnetic field B in the annular magnetron interaction region between the cathode emitter 2 and the inwardly directed tips of the vane resonators 3.

In operation the circular electric mode in the cavity 4 locks the vane resonators 3 to a π mode of oscillation at the frequency of the circular electric mode in the cavity 4. Output R.F. energy at the circular electric mode frequency is coupled by a coupling iris 6 in the outer wall of the cylindrical resonator 4 via a waveguide 7 to a transmitting antenna horn 8 which directs the output energy of the radar to the target.

A conductive tuning ring 9 is disposed in one end of the circular electric mode cavity 4 for tuning the output frequency of the tube 1. A mechanical spider 11 is coupled to the tuning ring 9. A tuning shaft 12 is fixed at one end to the spider 11 and includes a ball bearing yoke 13 at its outer end which rides on an eccentric portion 14 of a rotatable shaft 15. A gas tight bellows 16 provides a vacuum seal between the spider 11 and a portion 17 of the vacuum envelope of the tube 1.

A motor 18 is coupled to the shaft 15 for rotating the shaft at a suitable speed such as, for example, 200 revolutions per second. This rotary motion of the shaft 15 is transformed via the eccentric 14 into an oscillatory motion of the tuning shaft 12 and the coupled tuning ring 9 within the resonator 4 for producing an instantaneous frequency deviation of the output frequency of the tube 1 with a tuning cycle frequency corresponding to the rotating output speed of the motor 18, namely, 200 cycles per second.

A resolver 21 is coupled to the rotating shaft 15 for generating an output signal having a phase and magnitude corresponding to the instantaneous frequency deviation of the output frequency of the tube 1. The resolver signal is fed to an amplifier 22 and thence to the tuning input of a tunable local oscillator 23 of the radar receiver for causing the local oscillator frequency to track the instantaneous frequency deviation of the transmitted radar signal. The echo signal from the target is received in a receiver horn 24 and fed to the input of a radar receiver 25 wherein the echo signal is heterodyned with a sample of the local oscillator signal to produce a constant intermediate frequency which is amplified in the radar receiver, detected and displayed on a radar scope 26.

Dither tuning the transmitted radar signal and receiving the echo signal with a constant intermediate frequency greatly enhances the performance of the radar by reducing ground clutter and permitting the radar amplifiers to operate on a relatively narrow bandwidth channel thereby improving the signal-to-noise ratio of the radar.

Referring now to FIG. 2 there is shown the resolver 21 incorporating features of the present invention. The resolver 21 includes a transformer 31 having a primary winding 32 energized by a carrier frequency oscillator 33 at a suitable carrier frequency such as, for example 100 kHz. The secondary winding 34 of the transformer 31 is wound upon a rotatable magnetic core member 35 coupled to the rotating shaft 15 such that the carrier signal induced in the secondary winding 34 is amplitude modulated at a frequency corresponding to the frequency of rotation of the motor 18 and thus the dither tuning cycle frequency.

The amplitude modulated output of the secondary winding 34 is fed to one input of a phase sensitive detector 36 wherein it is compared with an unmodulated sample of the carrier frequency derived from the carrier frequency oscillator 33 to produce an output signal having a phase and magnitude corresponding to the instantaneous frequency deviation of the output signal of the tube 1. The output of the phase sensitive detector is fed via amplifier 22 to the tunable local oscillator 23, as previously described with regard to FIG. 1.

Although a phase sensitive detector 36 has been described, any other type of phase sensitive detector such as, for example, a synchronous detector may be employed for the phase sensitive detector 36.

Since many changes could be made in the above construction and apparently widely different embodiments of this invention could be made without departing from the scope thereof, it is intended that all matter contained in the above description or shown in the accompanying drawings shall be interpreted as illustrative and not in a limiting sense.

What is claimed is:

1. In a dither tuned microwave apparatus, means forming a microwave tube having a ditherable mechanical tuner, means for dithering said tuner for frequency modulating the output frequency of said tube, means forming a resolve coupled to said dither tuner for transforming mechanical motion into a signal having an amplitude and phase corresponding to the instantaneous frequency deviation of the output frequency of the tube, the improvemen wherein, said resolver means includes means for modulating a carrier signal at the frequency of the dither tuning cycle frequency, and a phase-sensitive detector for phase sensitively comparing the unmodulated carrier signal with the modulated carrier signal to derive a smooth resolver output signal having an amplitude and phase determinative of the instantaneous frequency deviation of the frequency modulated microwave output signal.

2. The apparatus of claim 1, wherein said means for modulating the carrier signal with the dither tuning cycle frequency includes a tranformer having a primary winding energized with the carrier signal, and a secondary winding rotated at the dither tuning cycle frequency.

3. The apparatus of claim 2, wherein said means for dithering said tuner includes a motor driving an eccentric output shaft, said eccentric shaft being coupled to said mechanical tuner, and wherein said rotatable secondary winding is coupled for rotation by the output shaft of said motor.

References Cited

UNITED STATES PATENTS

| 2,389,692 | 11/1945 | Sherwin | 329—50 X |
| 2,658,996 | 11/1953 | Lehde | 328—133 |

DONALD D. FORRER, Primary Examiner

R. C. WOODBRIDGE, Assistant Examiner

U.S. Cl. X.R.

307—232; 328—155; 329—50; 343—14, 17.5